(12) United States Patent
Martin

(10) Patent No.: US 10,583,523 B2
(45) Date of Patent: Mar. 10, 2020

(54) CIRCUMSCRIBING DEFECTS IN OPTICAL DEVICES

(71) Applicant: View, Inc., Milpitas, CA (US)

(72) Inventor: Todd William Martin, Mountain View, CA (US)

(73) Assignee: View, Inc., Milpitas, CA (US)

( * ) Notice: Subject to any disclaimer, the term of this patent is extended or adjusted under 35 U.S.C. 154(b) by 674 days.

(21) Appl. No.: 14/398,117

(22) PCT Filed: May 16, 2013

(86) PCT No.: PCT/US2013/041365
§ 371 (c)(1),
(2) Date: Oct. 30, 2014

(87) PCT Pub. No.: WO2013/173591
PCT Pub. Date: Nov. 21, 2013

(65) Prior Publication Data
US 2015/0108102 A1    Apr. 23, 2015

Related U.S. Application Data

(60) Provisional application No. 61/649,184, filed on May 18, 2012.

(51) Int. Cl.
*B23K 26/00* (2014.01)
*G02F 1/153* (2006.01)
(Continued)

(52) U.S. Cl.
CPC ............ *B23K 26/046* (2013.01); *B23K 26/06* (2013.01); *B23K 26/08* (2013.01); *B23K 26/361* (2015.10);
(Continued)

(58) Field of Classification Search
CPC ..... B23K 26/032; B23K 2203/50; G02F 1/15; G02F 1/1533; G02F 2201/508; G02F 1/1309
(Continued)

(56) References Cited

U.S. PATENT DOCUMENTS 3,271,286 A    9/1966    Lepselter
3,521,941 A    7/1970    Deb et al.
(Continued)

FOREIGN PATENT DOCUMENTS

CN    1755437 A    4/2006
CN    101274391 A    10/2008
(Continued)

OTHER PUBLICATIONS

U.S. Appl. No. 12/336,466, filed Dec. 16, 2008.
(Continued)

*Primary Examiner* — Dana Ross
*Assistant Examiner* — Lawrence H Samuels
(74) *Attorney, Agent, or Firm* — Weaver Austin Villeneuve & Sampson LLP; Brian D. Griedel

(57) ABSTRACT

Methods of circumscribing defects in optical devices are described. A perimeter is formed about a defect by laser ablation, where the perimeter electrically isolates the defect. The perimeter does not have damage due to excess energy from the laser and thus does not create new electrical shorts.

12 Claims, 10 Drawing Sheets

(51) Int. Cl.
*B23K 26/046* (2014.01)
*B23K 26/06* (2014.01)
*B23K 26/08* (2014.01)
*B23K 26/40* (2014.01)
*B23K 26/361* (2014.01)
*G02F 1/1523* (2019.01)
*B23K 103/00* (2006.01)

(52) U.S. Cl.
CPC .......... *B23K 26/40* (2013.01); *B23K 2103/50* (2018.08); *G02F 1/1523* (2013.01); *G02F 2201/508* (2013.01)

(58) Field of Classification Search
USPC ............ 219/121.69, 121.76, 121.78, 121.83
See application file for complete search history.

(56) References Cited

U.S. PATENT DOCUMENTS

| | | |
|---|---|---|
| 3,652,929 A | 3/1972 | Cushman |
| 4,166,918 A | 9/1979 | Nostrand et al. |
| 4,293,194 A | 10/1981 | Takahashi |
| 4,309,082 A | 1/1982 | Kohara et al. |
| 4,537,826 A | 8/1985 | Miyamura et al. |
| 4,543,171 A | 9/1985 | Firester et al. |
| 4,570,046 A | 2/1986 | Melanson et al. |
| 4,806,496 A | 2/1989 | Suzuki et al. |
| 4,937,423 A | 6/1990 | Yoshihara et al. |
| 5,011,582 A | 4/1991 | Oshikawa et al. |
| 5,017,755 A | 5/1991 | Yahagi et al. |
| 5,202,788 A | 4/1993 | Weppner |
| 5,290,986 A | 3/1994 | Colon et al. |
| 5,747,770 A | 5/1998 | Bogart |
| 5,837,960 A * | 11/1998 | Lewis .................... B23K 26/34 219/121.63 |
| 5,907,383 A | 5/1999 | Kurihara et al. |
| 6,184,977 B1 | 2/2001 | Ishida |
| 6,225,640 B1 | 5/2001 | Glenn et al. |
| 6,228,662 B1 | 5/2001 | Hayashi et al. |
| 6,337,758 B1 * | 1/2002 | Beteille ................. G02F 1/1533 359/265 |
| 6,750,662 B1 | 6/2004 | Van Der Heide |
| 6,834,158 B1 | 12/2004 | Templeton |
| 6,878,900 B2 * | 4/2005 | Corkum ............... B23K 26/032 219/121.69 |
| 7,001,540 B2 | 2/2006 | Kloeppner |
| 7,259,730 B2 | 8/2007 | O'Keefee |
| 7,531,101 B2 * | 5/2009 | Beteille ............. B32B 17/10174 216/33 |
| 7,687,740 B2 * | 3/2010 | Bruland ............. B23K 26/0613 219/121.67 |
| 8,045,146 B2 | 10/2011 | Saito et al. |
| 8,213,074 B1 | 7/2012 | Shrivastava et al. |
| 8,300,298 B2 | 10/2012 | Wang et al. |
| 8,432,603 B2 | 4/2013 | Wang et al. |
| 8,582,193 B2 | 11/2013 | Wang et al. |
| 8,764,950 B2 | 7/2014 | Wang et al. |
| 8,764,951 B2 | 7/2014 | Wang et al. |
| 8,780,432 B1 | 7/2014 | Nguyen |
| 8,929,406 B2 | 1/2015 | Chuang et al. |
| 9,507,232 B2 * | 11/2016 | Rozbicki .................... G02F 1/15 |
| 9,638,977 B2 | 5/2017 | Friedman et al. |
| 9,885,934 B2 | 2/2018 | Rozbicki et al. |
| 10,532,948 B2 | 1/2020 | Rozbicki et al. |
| 10,534,237 B2 | 1/2020 | Friedman et al. |
| 2003/0081201 A1 | 5/2003 | Shibata et al. |
| 2003/0103108 A1 * | 6/2003 | Liu ........................ B23K 26/08 347/47 |
| 2003/0111447 A1 * | 6/2003 | Corkum ............... B23K 26/032 219/121.69 |
| 2003/0227663 A1 | 12/2003 | Agrawal et al. |
| 2004/0101981 A1 | 5/2004 | Morishita |
| 2006/0098264 A1 | 5/2006 | Park |
| 2006/0193031 A1 | 8/2006 | Moore |
| 2006/0197462 A1 | 9/2006 | Uchiyama et al. |
| 2007/0081151 A1 | 4/2007 | Shortt et al. |
| 2007/0092128 A1 | 4/2007 | Noy et al. |
| 2007/0092129 A1 | 4/2007 | Noy et al. |
| 2007/0097481 A1 | 5/2007 | Burdis et al. |
| 2007/0141360 A1 * | 6/2007 | Beteille ............. B32B 17/10174 428/432 |
| 2007/0236180 A1 | 10/2007 | Rogers |
| 2007/0289768 A1 | 12/2007 | Moore et al. |
| 2008/0128286 A1 | 6/2008 | Wu et al. |
| 2008/0178905 A1 * | 7/2008 | Turner .................. B08B 7/0042 134/1 |
| 2008/0239452 A1 | 10/2008 | Xu et al. |
| 2008/0304130 A1 | 12/2008 | Nguyen |
| 2008/0304131 A1 | 12/2008 | Nguyen |
| 2009/0279079 A1 | 11/2009 | Shibata et al. |
| 2009/0323160 A1 | 12/2009 | Egerton et al. |
| 2010/0074515 A1 | 3/2010 | Zhao et al. |
| 2010/0243427 A1 * | 9/2010 | Kozlowski .......... C03C 17/3417 204/192.1 |
| 2010/0245973 A1 | 9/2010 | Wang et al. |
| 2010/0311204 A1 | 12/2010 | Komin et al. |
| 2011/0048614 A1 | 3/2011 | Veerasamy |
| 2011/0151591 A1 | 6/2011 | Yamamuro et al. |
| 2011/0266138 A1 | 11/2011 | Wang et al. |
| 2012/0026573 A1 | 2/2012 | Collins et al. |
| 2012/0062975 A1 | 3/2012 | Mehtani et al. |
| 2012/0302121 A1 | 11/2012 | Sbar et al. |
| 2013/0092679 A1 * | 4/2013 | Rozbicki ................... G02F 1/15 219/121.85 |
| 2013/0258436 A1 | 10/2013 | Podbelski |
| 2013/0306615 A1 | 11/2013 | Rozbicki et al. |
| 2015/0077831 A1 | 3/2015 | Friedman et al. |
| 2015/0097944 A1 | 4/2015 | Palm et al. |
| 2017/0003566 A1 | 1/2017 | Friedman et al. |
| 2017/0044057 A1 | 2/2017 | Rozbicki et al. |
| 2017/0130523 A1 | 5/2017 | Shrivastava et al. |
| 2018/0180962 A1 | 6/2018 | Rozbicki et al. |
| 2019/0243204 A1 | 8/2019 | Collins et al. |
| 2019/0302562 A1 | 10/2019 | Friedman et al. |

FOREIGN PATENT DOCUMENTS

| | | |
|---|---|---|
| CN | 101697040 A | 4/2010 |
| CN | 1703653 A | 11/2015 |
| EP | 0958882 A2 | 11/1999 |
| EP | 2036652 A1 | 3/2009 |
| JP | S56-35125 A | 4/1981 |
| JP | S58-93591 A | 6/1983 |
| JP | 07-028099 | 1/1995 |
| JP | H10-58169 A | 3/1998 |
| JP | 2001-066418 | 3/2001 |
| JP | 2007-205724 A | 8/2007 |
| JP | 2009-198230 A | 9/2009 |
| KR | 10-2007-0099216 A | 10/2007 |
| KR | 10-0838656 B1 | 6/2008 |
| KR | 10-2011-0084703 A | 7/2011 |
| KR | 10-2012-0127171 A | 11/2012 |
| TW | 201116918 A | 5/2011 |
| WO | WO 2004/034138 A1 | 4/2004 |
| WO | WO 2010/120535 A2 | 10/2010 |
| WO | WO 2012/154320 A1 | 11/2012 |
| WO | WO 2013/039915 A1 | 3/2013 |
| WO | WO2013/130781 A1 | 9/2013 |
| WO | WO 2013/138535 A1 | 9/2013 |
| WO | WO2013/173591 | 11/2013 |
| WO | WO2013/177575 | 11/2013 |

OTHER PUBLICATIONS

U.S. Office Action dated Feb. 8, 2016 in U.S. Appl. No. 13/610,612.
U.S. Notice of Allowance dated Jul. 19, 2016 in U.S. Appl. No. 13/610,612.
U.S. Notice of Allowance dated Sep. 14, 2016 (supplemental) in U.S. Appl. No. 13/610,612.
U.S. Office Action dated Mar. 24, 2016 in U.S. Appl. No. 13/859,623.
U.S. Office Action dated Jun. 12, 2012 in U.S. Appl. No. 12/336,466.

(56) References Cited

OTHER PUBLICATIONS

U.S. Final Office Action dated Oct. 30, 2012 in U.S. Appl. No. 12/336,466.
U.S. Office Action dated Sep. 13, 2013 in U.S. Appl. No. 12/336,466.
U.S. Office Action dated May 9, 2014 in U.S. Appl. No. 12/336,466.
U.S. Final Office Action dated Mar. 18, 2015 in U.S. Appl. No. 12/336,466.
U.S. Office Action dated Jul. 5, 2016 in U.S. Appl. No. 12/336,466.
U.S. Office Action dated Mar. 11, 2016 in U.S. Appl. No. 14/384,146.
U.S. Notice of Allowance dated Aug. 15, 2016 in U.S. Appl. No. 14/384,146.
International Search Report dated Jan. 31, 2013 in PCT Application No. PCT/US2012/054665.
International Preliminary Report on Patentability dated Mar. 27, 2014 in PCT Application No. PCT/US2012/054665.
International Search Report dated Aug. 4, 2014 in PCT Application No. PCT/US2014/033059.
International Preliminary Report on Patentability dated Jul. 29, 2015 in PCT Application No. PCT/US2014/033059.
International Search Report dated Jun. 4, 2013 in PCT Application No. PCT/US2013/031098.
International Preliminary Report on Patentability dated Sep. 25, 2014 in PCT Application No. PCT/US2013/031098.
International Preliminary Report on Patentability for PCT/US2013/041365 dated Nov. 27, 2014.
EP Extended Search Report dated Jun. 18, 2015 for EP Application No. 12832253.4.
EP Extended Search Report dated Sep. 21, 2015 for EP Application No. 13760591.1.
EP Office Action dated Oct. 7, 2016 in EP Application No. 13760591.1.
EP Partial Supplementary Search Report dated Jan. 25, 2016 for EP Application No. 13791156.6.
EP Extended Search Report dated May 13, 2016 for EP Application No. 13791156.6.
CN Office Action dated Oct. 13, 2015 in CN Application No. 201380025529.2.
CN Office Action dated Aug. 31, 2016 in CN Application No. 201380025529.2.
TW Office Action dated Apr. 8, 2016 in TW Application No. 101133555.
International Search Report and Written Opinion for PCT/US2013/041365 dated Aug. 27, 2013.
International Search Report and Written Opinion for PCT/2013/042765 dated Aug. 23, 2013.
U.S. Office Action dated Jan. 6, 2017 in U.S. Appl. No. 13/859,623.
U.S. Office Action dated Nov. 30, 2017 in U.S. Appl. No. 12/336,466.
U.S. Office Action dated Jan. 12, 2017 in U.S. Appl. No. 14/384,146.
U.S. Notice of Allowance dated Mar. 7, 2017 in U.S. Appl. No. 14/384,146.
U.S. Notice of Allowance dated Sep. 7, 2017 in U.S. Appl. No. 13/859,623.
CN Office Action dated Mar. 13, 2017 in CN Application No. 201380025529.2.
TW Office Action dated Jul. 11, 2017 in TW Application No. 105138289.
U.S. Office Action dated Jan. 11, 2018 in U.S. Appl. No. 15/252,099.
U.S. Office Action dated Jun. 16, 2017 for U.S. Appl. No. 15/039,370.
U.S. Final Office Action dated Dec. 29, 2017 for U.S. Appl. No. 15/039,370.
U.S. Appl. No. 15/833,924, filed Dec. 6, 2017, Rozbicki et al.
U.S. Office Action dated Dec. 27, 2018 in U.S. Appl. No. 15/283,151.
U.S. Notice of Allowance dated Dec. 18, 2018 in U.S. Appl. No. 15/252,099.
U.S. Office Action dated Oct. 19, 2018 for U.S. Appl. No. 15/039,370.
EP Extended European Search Report dated Oct. 15, 2018 in EP Application No. EP 18169307.8.
CN Office Action dated Oct. 31, 2018 in CN Application No. 201710684104.2.
TW Office Action dated Oct. 22, 2018 in TW Application No. TW 107129732.
U.S. Final Office Action dated Nov. 1, 2018 in U.S. Appl. No. 12/336,466.
CN Office Action dated Aug. 14, 2019 in CN Application No. 201710684104.2.
Wang, S., "Laser Process Apparatus and Technology," Huazhong University of Science and Technology Press, Sep. 30, 2011, p. 86. [No transl provided].
U.S. Office Action dated Aug. 7, 2019 in U.S. Appl. No. 16/267,260.
Preliminary Amendment filed Jun. 18, 2019 in U.S. Appl. No. 16/443,585.
U.S. Notice of Allowance dated Sep. 5, 2019 in U.S. Appl. No. 15/283,151.
U.S. Notice of Allowance dated Sep. 12, 2019 in U.S. Appl. No. 15/252,099.
U.S. Office Action dated Oct. 3, 2019 in U.S. Appl. No. 15/039,370.
EP Examination Report dated Oct. 29, 2019 for EP Application No. 12832253.4.
EP Office Action dated Sep. 16, 2019 in EP Application No. EP 18169307.8.

* cited by examiner

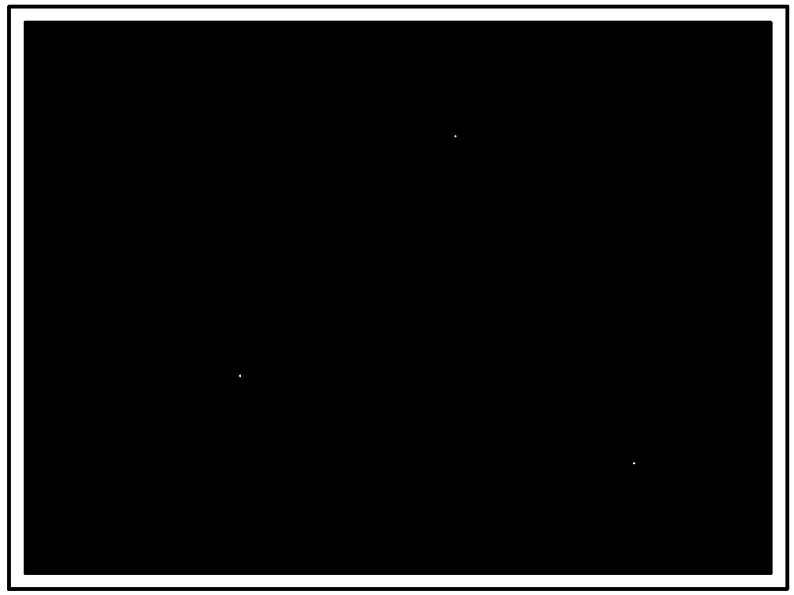
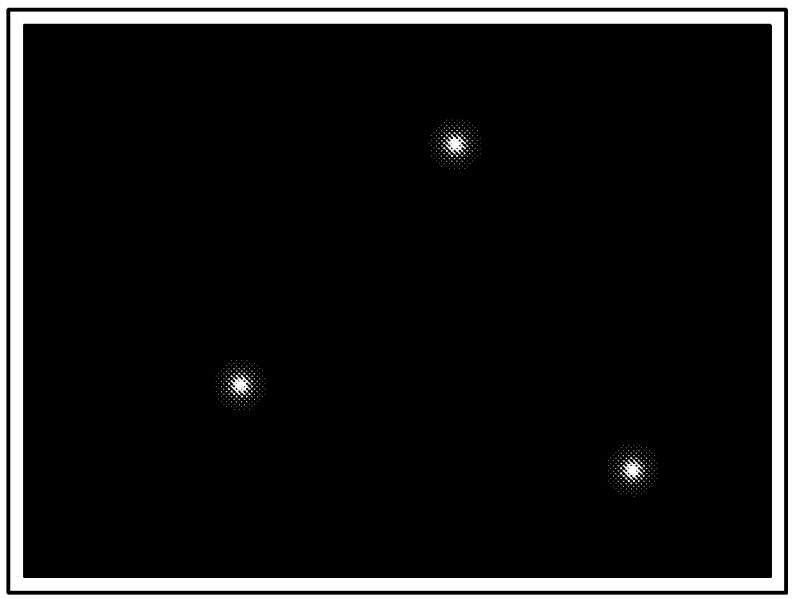
Fig. 5

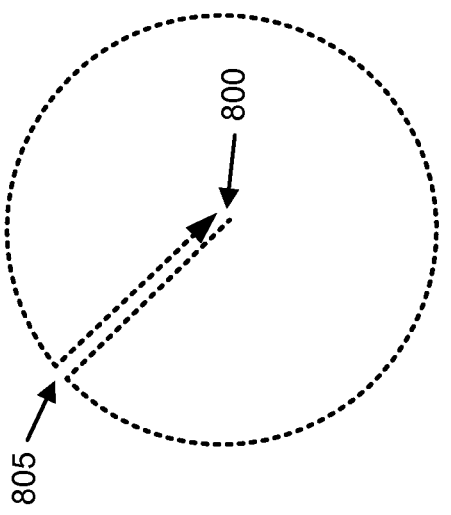
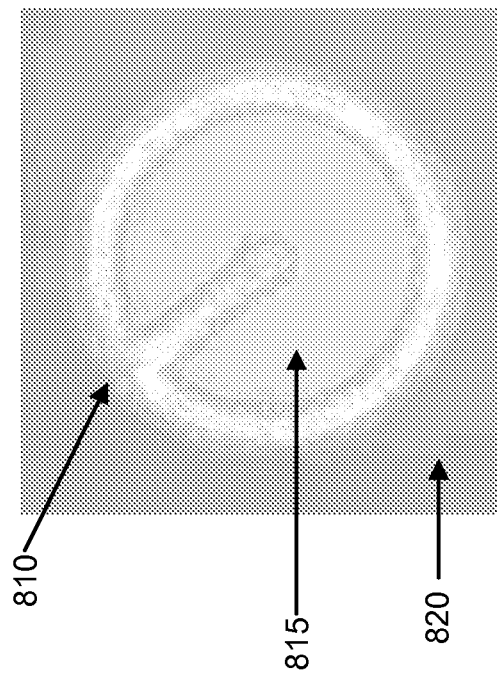
*Fig. 8*
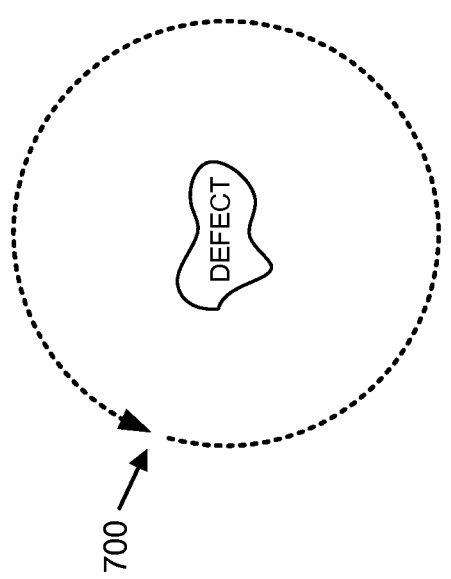
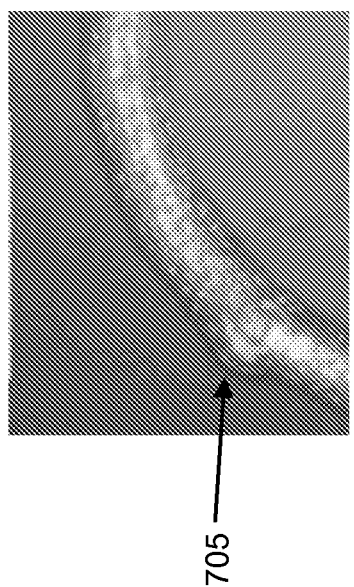
(Prior Art)
*Fig. 7*

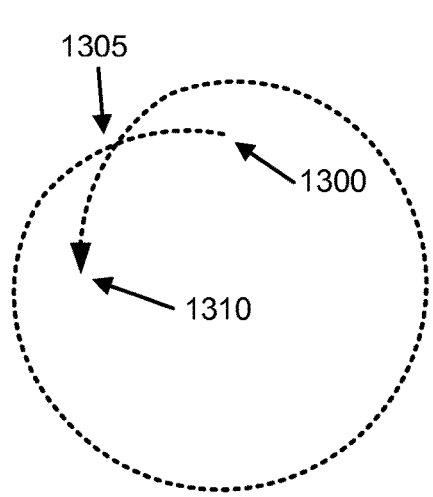
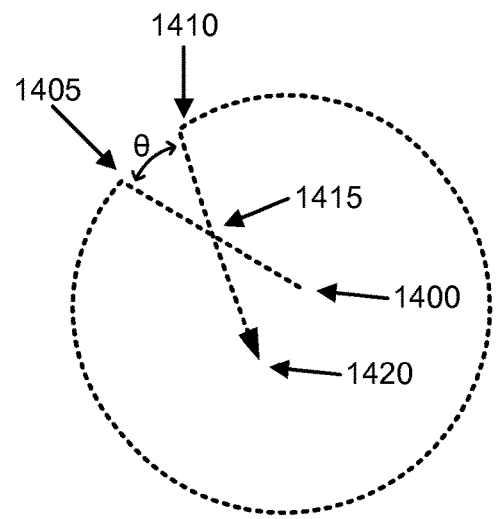
*Fig. 13*  *Fig. 14*
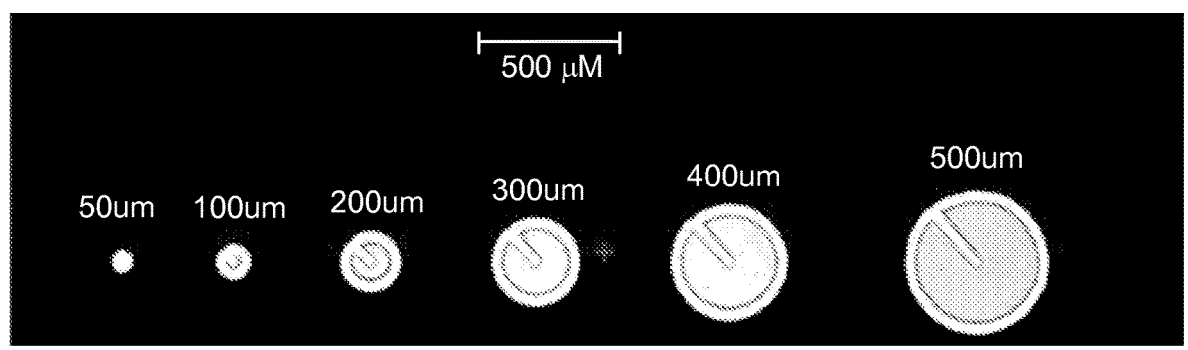
*Fig. 15*

CIRCUMSCRIBING DEFECTS IN OPTICAL DEVICES

CROSS-REFERENCE TO RELATED APPLICATION

This application is a national stage application under 35 U.S.C. §371 to International Application PCT/US2013/041365 (designating the United States), titled "CIRCUMSCRIBING DEFECTS IN OPTICAL DEVICES" and filed on May 16, 2013, which claims benefit of U.S. Provisional Pat. Application Ser. No. 61/649,184, filed on May 18, 2012, titled "CIRCUMSCRIBING DEFECTS IN OPTICAL DEVICES," each of which is hereby incorporated by reference in its entirety.

FIELD

The description relates generally to optical devices, more particularly to methods and apparatus related to mitigation of defects in optical devices, for example, flat panel displays, electrochromic windows and the like.

BACKGROUND

Optical devices include photovoltaics, electrochromic devices, thermochromic devices, flat panel displays and the like. Advancements in optical device technology have increased dramatically in recent years including ever lower levels of defectivity in the thin film device that generates the desired optical and/or electrical properties. This is particularly important in devices where visual perception of the device is important, because defects often manifest themselves as visually discernible, and thus unattractive, phenomenon to the end user. Still, even with improved manufacturing methods, optical devices have some level of defectivity. Moreover, even if an optical device is manufactured with no visible defects, such visible defects may manifest during testing and/or deployment of the optical device. One particularly troublesome defect is an electrical short circuiting defect in an optical device.

SUMMARY

Various methods herein can be applied to virtually any optical device that includes a material that can be isolable locally or where the defect is stationary; e.g., all solid state electrochromic devices are well suited for methods described herein. Herein are described methods for circumscribing defects in optical devices, e.g., in switchable electrochromic windows. For convenience, methods are described in terms of application to electrochromic devices; however, this is only meant as a means to simplify the description. Methods described herein may be performed on an electrochromic device of an electrochromic lite prior to incorporation into an insulated glass unit (IGU), after incorporation into an IGU (or laminate), or both.

One embodiment is a method of forming a laser ablation perimeter surrounding a defect in an optical device, the method including: a) starting application of a laser at a first fluence level in a first region of the laser ablation perimeter; b) translating the laser from the first region to a second region of the laser ablation perimeter, while increasing the fluence level of the laser as it transitions from the first region to the second region; and c) returning the laser to the first region in order to close the perimeter while decreasing the fluence level of the laser; wherein the energy about the laser ablation perimeter is substantially uniform and the overlap of the laser in the first region is at least about 25%. Decreasing the fluence level may include defocusing the laser.

Another embodiment is a method of forming a laser ablation perimeter surrounding a defect in an optical device, the method including forming the laser ablation perimeter by overlapping a starting and a stopping laser ablation position, wherein the overlap of the starting and the stopping positions is less than about 25%.

Another embodiment is a method of forming a laser ablation perimeter surrounding a defect in an optical device, the method including: a) starting application of a laser at a first position within an area that will be surrounded by the laser ablation perimeter; b) translating the laser from the first position to a second position, the second position being a part of the laser ablation perimeter; c) translating the laser about the defect until the laser focus is proximate the second position; d) closing the laser ablation perimeter by overlapping the second position with the laser focus; and e) returning the laser to the area surrounded by the laser ablation perimeter. In one embodiment, e) includes returning the laser to the first position.

In embodiments where overlapping laser lines or points do not include overlap between start and stop positions of a laser, the overlap can be between about 10% and about 100% of the laser line or point, or between about 25% and about 90% of the laser line or point, or between about 50% and about 90% of the laser line or point.

One embodiment is a method of forming a laser ablation perimeter surrounding a defect in an optical device, the method including: a) starting application of a laser at a first position, within the line that will define the laser ablation perimeter; b) translating the laser about the defect until the laser focus is proximate the first position; c) closing the laser ablation perimeter by overlapping the laser focus with the first position; and d) moving the laser to the area surrounded by the laser ablation perimeter. In one embodiment, d) includes moving the laser to the center of the perimeter. In one embodiment, d) includes moving the laser inside the first position in a spiral pattern, at least some overlap occurring in the spiral pattern.

One embodiment is a method of forming a laser ablation perimeter surrounding a defect in an optical device, the method including: a) starting application of a laser at a first position, within the area that will be surrounded by the laser ablation perimeter; b) translating the laser from the first position to a second position, the second position being a part of the laser ablation perimeter; c) translating the laser about the defect until the laser focus is proximate the second position; and d) closing the laser ablation perimeter by overlapping the second position with the laser focus, wherein the closure position is also the stopping position of the laser.

One embodiment is a method of forming a substantially circular laser ablation perimeter surrounding a defect in an optical device, the method including: a) starting application of a laser at a first position, the first position located at what will be the center of the substantially circular laser ablation perimeter; b) translating the laser from the first position to a second position, the second position being a part of the laser ablation perimeter; c) translating the laser about the defect in a substantially circular pattern until the laser focus is proximate the second position; d) closing the laser ablation perimeter by overlapping the second position with the laser focus; and e) returning the laser to the first position where the laser ablation is ceased.

One embodiment is a method of forming a laser ablation perimeter surrounding a defect in an optical device, the method comprising: a) energizing a laser while the laser beam is shuttered; b) allowing the laser to reach a steady state energy level; and c) circumscribing the defect with the laser.

One embodiment is a method of forming a laser ablation perimeter surrounding a defect in an optical device, the method including: a) starting application of a laser at a starting position, within the area that will be surrounded by the laser ablation perimeter; b) translating the laser from the first position and about the defect until the laser focus crosses its own path, but not at the starting position. The laser may be stopped at the crossing point or once past the crossing point.

One embodiment is a method of forming a laser ablation perimeter surrounding a defect in an optical device, the method including: a) starting application of a laser at a first position, within the area that will be surrounded by the laser ablation perimeter; b) translating the laser from the first position to a second position, the second position being a part of the laser ablation perimeter; and c) translating the laser about the defect until the laser focus crosses its own path, between the first and second position. The laser may be stopped at the crossing point or once past the crossing point.

One embodiment is a method of forming a laser ablation perimeter about a defect in an optical device. The method includes starting application of a laser with a laser focus at a first position located proximate the defect and at least partially mitigating the defect. The method moves the laser focus from the first position to a second position at the laser ablation perimeter. The method also moves the laser focus along the laser ablation perimeter until the laser focus is proximate the second position and then closes the laser ablation perimeter. There may be an overlap at the second position.

One embodiment is a method of ablating a defect in an optical device. The method includes starting application of a laser with a laser focus at a first position at or near the defect and moving the laser focus to cover one or more regions around the defect. The laser focus can be moved to cover the regions by, for example, rasterizing the laser focus over the one or more regions. There may be overlap of the laser focus during rasterizing, or not. A regular or irregular area of laser ablation may result.

These and other features and advantages will be described in further detail below, with reference to the associated drawings.

BRIEF DESCRIPTION OF THE DRAWINGS

The following detailed description can be more fully understood when considered in conjunction with the drawings in which:

FIG. 5 depicts an electrochromic lite having three halo shorting type defects while the lite is in the colored state, before and after laser scribe to convert the halos into pinholes.

FIG. 7 depicts a conventional laser ablation circumscription pattern.

FIG. 8 depicts a laser ablation circumscription as described herein.

FIGS. 9-14 depict various laser ablation circumscription patterns in accord with embodiments described herein.

FIG. 15 shows images of actual laser ablations of varying sizes following a scribe pattern as described in relation to FIG. 7.

DETAILED DESCRIPTION

For the purposes of brevity, embodiments described below are described in terms of an electrochromic lite. One of ordinary skill in the art would appreciate that methods and apparatus described herein can be used for virtually any optical device having shorting type defects. Optical devices include electrochromic devices, thermochromic devices, flat panel displays, photovoltaic devices, and the like. Also, various embodiments are described in terms of forming a laser ablation perimeter about a defect. Typically, these perimeters are drawn or described as being circular. This is not necessary, and the perimeters can be of any shape, whether regular or irregular. Lasers are particularly useful in forming the perimeters, but other focused energy sources can be substituted for any embodiment described herein; this is particularly so when the focused energy source has associated transient energy flux associated with powering up or turning off the focused energy applied to perform the process. Other focused energy sources may include ion beams, electron beams, and electromagnetic beams having different frequencies/wavelengths, for example.

For context, a description of electrochromic devices and defectivity in electrochromic devices is presented below. For convenience, solid state and inorganic electrochromic devices are described, however, the embodiments are not limited in this way, i.e., the embodiments apply to any device where a defect, e.g., an electrical shorting defect, can be excised by circumscription with a laser or other suitable energy source.

Electrochromic Devices

Figure 1A:
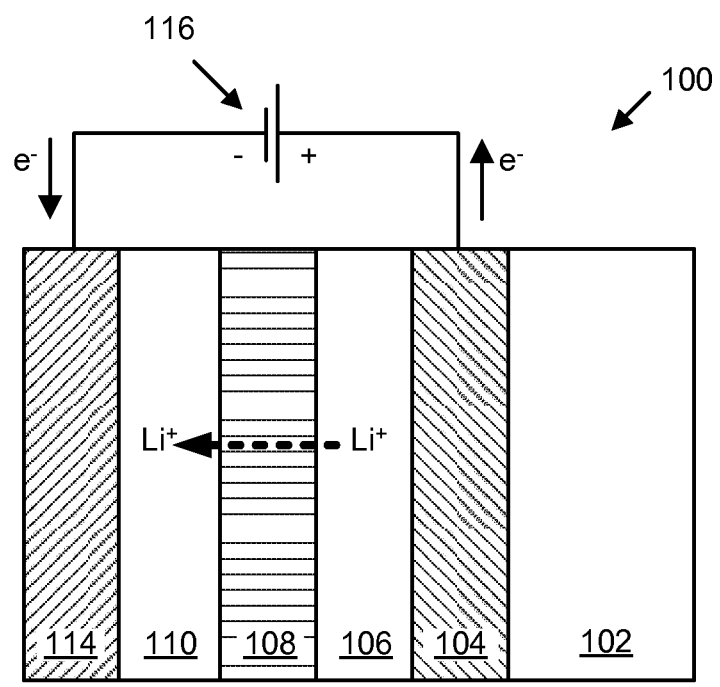
FIG. 1A is a schematic cross-section of an electrochromic device in a bleached state.

FIG. 1A depicts a schematic cross-section of an electrochromic device, 100. Electrochromic device 100 includes a transparent substrate, 102, a conductive layer, 104, an electrochromic layer (EC), 106, an ion conducting layer (IC), 108, a counter electrode layer (CE), 110, and a conductive layer (CL), 114. This stack of layers 104, 106, 108, 110, and 114 are collectively referred to as an electrochromic device or coating. This is a typical, though non-limiting, construct of an electrochromic device. A voltage source, 116, typically a low voltage source operable to apply an electric potential across the electrochromic stack, effects the transition of the electrochromic device from, for example, a bleached state to a colored state. In FIG. 1A, the bleached state is depicted, e.g., the EC and CE layers are not colored, but rather transparent. The order of layers can be reversed with respect to the substrate. Some electrochromic devices will also include a capping layer to protect conductive layer 114. This capping layer may be a polymer and/or an additional transparent substrate such as glass or plastic. In some devices, one of the conducting layers is a metal to impart reflective properties to the device. In many instances, both conductive layers 114 and 104 are transparent, e.g., transparent conductive oxides, like indium tin oxide, fluorinated tin oxide, zinc oxides and the like. Substrate 102 is typically a transparent, e.g., glass or plastic material.

Certain devices employ electrochromic and counter electrode (ion storage) layers that are complementarily coloring. For example, the ion storage layer 110 may be anodically coloring and the electrochromic layer cathodically coloring. For device 100 in the bleached state as depicted in FIG. 1A, when the applied voltage is applied in one direction as depicted, ions, for example lithium ions, are intercalated into ion storage layer 110, the ion storage layer is bleached. Likewise, when the lithium ions move out of electrochromic layer 104, it also bleaches, as depicted. The ion conducting layer allows movement of ions through it, but it is electrically insulating, thus preventing short circuiting the device between the conducting layers (and electrodes formed therefrom).

Electrochromic devices, e.g., those having distinct layers as described above, can be fabricated as all solid state and inorganic devices with low defectivity. Such all solid-state and inorganic electrochromic devices, and methods of fabricating them, are described in more detail in U.S. patent application, Ser. No. 12/645,111, entitled, "Fabrication of Low-Defectivity Electrochromic Devices," filed on Dec. 22, 2009 and naming Mark Kozlowski et al. as inventors, and in U.S. patent application, Ser. No. 12/645,159 (now U.S. Pat. No. 8,432,603), entitled, "Electrochromic Devices," filed on Dec. 22, 2009 and naming Zhongchun Wang et al. as inventors, both of which are incorporated by reference herein for all purposes.

It should be understood that the reference to a transition between a bleached state and colored state is non-limiting and suggests only one example, among many, of an electrochromic transition that may be implemented. Unless otherwise specified herein, whenever reference is made to a bleached-colored transition, the corresponding device or process encompasses other optical state transitions, such as non-reflective-reflective, transparent-opaque, etc. Further, the term "bleached" refers to an optically neutral state, for example, uncolored, transparent or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

Any material having suitable optical, electrical, thermal, and mechanical properties may be used as substrate 102. Such substrates include, for example, glass, plastic, and mirror materials. Suitable plastic substrates include, for example, acrylic, polystyrene, polycarbonate, allyl diglycol carbonate, SAN (styrene acrylonitrile copolymer), poly(4-methyl-1-pentene), polyester, polyamide, etc. If a plastic substrate is used, it is preferably barrier protected and abrasion protected using a hard coat of, for example, a diamond-like protection coating, a silica/silicone anti-abrasion coating, or the like, such as is well known in the plastic glazing art. Suitable glasses include either clear or tinted soda lime glass, including soda lime float glass. The glass may be untempered, strengthened (heat or chemically) or tempered. An electrochromic device with glass, for example, soda lime glass, used as a substrate may include a sodium diffusion barrier layer between the soda glass and the device to prevent diffusion of sodium ions from the glass into the device. Both glass and plastic substrates are compatible with embodiments described herein, so long as their properties are accounted for in the described methods. This is explained in further detail below.

Figure 1B:
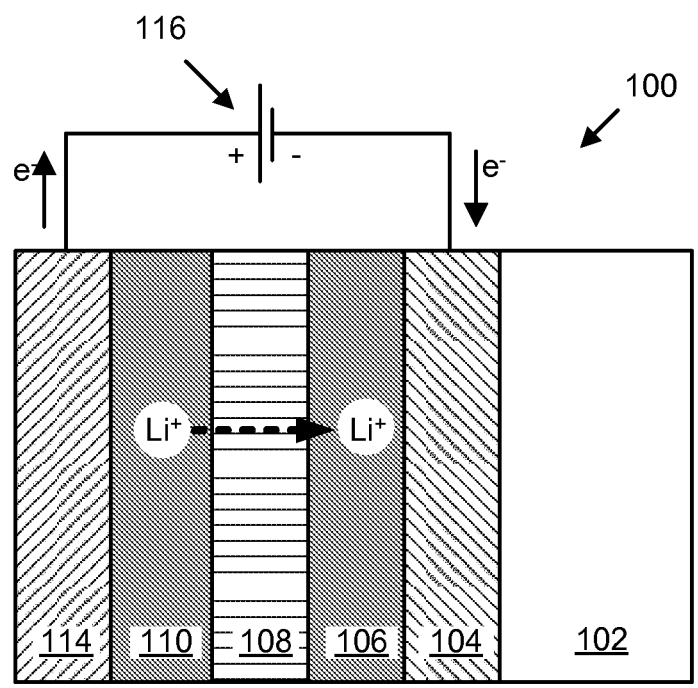
FIG. 1B is a schematic cross-section of an electrochromic device in a colored state.

FIG. 1B is a schematic cross-section of electrochromic device 100 shown in FIG. 1A but in a colored state (or transitioning to a colored state). In FIG. 1B, the polarity of voltage source 116 is reversed, so that the electrochromic layer is made more negative to accept additional lithium ions, and thereby transition to the colored state; at the same time, lithium ions leave the counter electrode or ion storage layer 110, and it also colors. As indicated by the dashed arrow, lithium ions are transported across ion conducting layer 108 to electrochromic layer 106. Exemplary materials that color complimentarily in this fashion are tungsten oxide (electrochromic layer) and nickel-tungsten oxide (counter electrode layer).

Certain electrochromic devices may include reflective materials in one or both electrodes in the device. For example, an electrochromic device may have one electrode that colors anodically and one electrode that becomes reflective cathodically. Such devices are compatible with embodiments described herein so long as the reflective nature of the device is taken into account. This is explained in more detail below.

The all solid state and inorganic electrochromic devices described above have low defectivity and high reliability, and thus are well suited for electrochromic windows, particularly those with large format architectural glass substrates.

Not all electrochromic devices have a distinct ion conducting layer as depicted in FIGS. 1A and 1B. As conventionally understood, the ionically conductive layer prevents shorting between the electrochromic layer and the counter electrode layer. The ionically conductive layer allows the electrochromic and counter electrode layers to hold a charge and thereby maintain their bleached or colored states. In electrochromic devices having distinct layers, the components form a stack which includes the ion conducting layer sandwiched between the electrochromic layer and the counter electrode layer. The boundaries between these three stack components are defined by abrupt changes in composition and/or microstructure. Thus, such devices have three distinct layers with two abrupt interfaces.

Quite surprisingly, it has been discovered that high quality electrochromic devices can be fabricated without depositing an ionically conducting electrically insulating layer. In accordance with certain embodiments, the counter electrode and electrochromic layers are formed immediately adjacent one another, often in direct contact, without separately depositing an ionically conducting layer. It is believed that various fabrication processes and/or physical or chemical mechanisms produce an interfacial region between contacting electrochromic and counter electrode layers, and that this interfacial region serves at least some functions of an ionically conductive electronically insulating layer as in devices having such a distinct layer. Such devices, and methods of fabricating them, are described in U.S. patent applications, Ser. No. 12/772,055 (now U.S. Pat. No. 8,300,298) and Ser. No. 12/772,075, each filed on Apr. 30, 2010, and in U.S. patent applications, Ser. Nos. 12/814,277 and 12/814,279, each filed on Jun. 11, 2010—each of the four applications is entitled "Electrochromic Devices," each names Zhongchun Wang et al. as inventors, and each is incorporated by reference herein for all purposes. A brief description of these devices follows.

Figure 2:
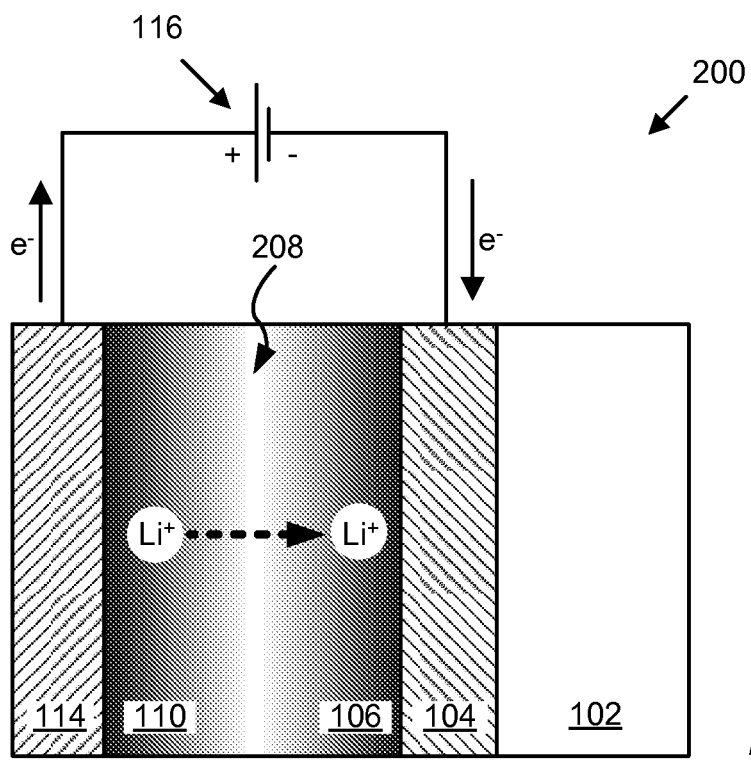
FIG. 2 is a schematic cross-section of an electrochromic device having an ion conducting electronically insulating interfacial region rather than a distinct IC layer.

FIG. 2 is a schematic cross-section of an electrochromic device, 200, in a colored state, where the device has an ion conducting electronically insulating interfacial region, 208, serving the function of a distinct IC layer. Voltage source 116, conductive layers 114 and 104, and substrate 102 are essentially the same as described in relation to FIGS. 1A and 1B. Between conductive layers 114 and 104 is graded region, which includes counter electrode layer 110, electrochromic layer 106, and an ion conducting electronically insulating interfacial region, 208, between them, rather than a distinct IC layer. In this example, there is no distinct boundary between counter electrode layer 110 and interfacial region 208, nor is there a distinct boundary between electrochromic layer 106 and interfacial region 208. Collectively, regions 110, 208 and 106 may be thought of as a continuous graded region. There is a diffuse transition between CE layer 110 and interfacial region 208, and between interfacial region 208 and EC layer 106. These devices may be thought of as "no IC layer" devices. Conventional wisdom was that each of the three layers should be laid down as distinct, uniformly deposited, and smooth layers to form a stack. The interface between each layer should be "clean" where there is little intermixing of materials from each layer at the interface. One of ordinary skill in the art would recognize that in a practical sense there is inevitably some degree of material mixing at layer interfaces, but the point is, in conventional fabrication methods any such mixing is unintentional and minimal. The inventors of this technology found that interfacial regions serving as IC layers can be formed where the interfacial region includes significant quantities of one or more electrochromic and/or counter electrode materials by design. This is a radical departure from conventional fabrication methods. However, as in conventional electrochromic devices, shorting can occur across the interfacial region. Various methods described herein are applicable to devices having such interfacial regions, rather than IC layers.

The all solid state and inorganic electrochromic devices described above have low defectivity and high reliability. However, defects can still occur. For context, visually discernible defects in electrochromic devices are described below in relation to conventional layered stack type electrochromic devices so as to more fully understand the nature of the disclosed embodiments.

Visible Defects in Electrochromic Devices

As used herein, the term "defect" refers to a defective point or region of an electrochromic device. Defects may be characterized as visible or non-visible. Often a defect will be manifest as a visually discernible anomaly in the electrochromic window or other device. Such defects are referred to herein as "visible" defects. Typically, these defects are visible when the electrochromic device is transitioned to the tinted state due to the contrast between the normally operating device area and an area that is not functioning properly, e.g., there is more light coming through the device in the area of the defect. Other defects are so small that they are not visually noticeable to the observer in normal use. For example, such defects do not produce a noticeable light point when the device is in the colored state during daytime.

A "short" is a localized electronically conductive pathway spanning the ion conducting layer or region (supra), for example, an electronically conductive pathway between the two transparent conductive oxide layers.

In some cases, an electrical short is created by an electrically-conductive particle spanning the ion conducting layer, thereby causing an electronic path between the counter electrode and the electrochromic layer or the TCO associated with either one of them. In some other cases, a defect is caused by a particle on the substrate (on which the electrochromic stack is fabricated) and such a particle causes layer delamination (sometimes called "pop-off") where the layers do not adhere properly to the substrate. Delamination of layers can also occur without association with a particle contaminant and may be associated with an electrical short, and thus a halo. A delamination or pop-off defect can lead to a short if it occurs before a TCO or associated EC or CE is deposited. In such cases, the subsequently deposited TCO or EC/CE layer will directly contact an underlying TCO or CE/EC layer providing direct electronic conductive pathway. Particle related defects are illustrated below in FIGS. 3 and 4A-4C.

Figure 3:
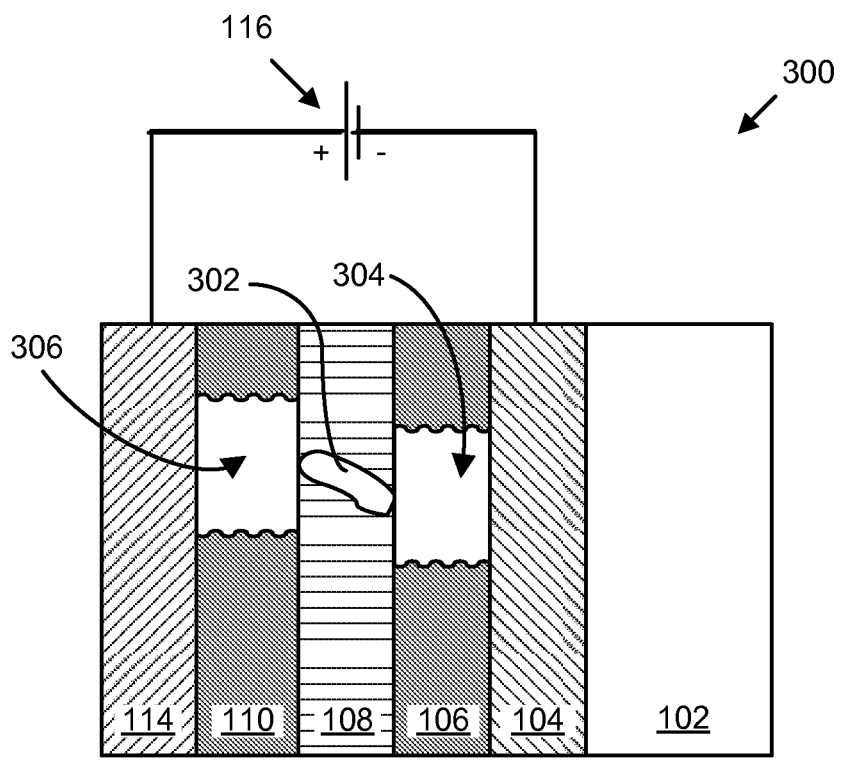
FIG. 3 is a schematic cross-section of an electrochromic device with a particle in the ion conducting layer causing a localized defect in the device.

FIG. 3 is a schematic cross-section of an electrochromic device, 300, with a particle, 302, in and spanning the ion conducting layer causing a localized shorting defect in the device. Device 300 is depicted with typical distinct layers, although particles in this size regime would cause visual defects in electrochromic devices employing ion conducting electronically insulating interfacial regions as well. Electrochromic device 300 includes the same components as depicted in FIG. 1A for electrochromic device 100. In ion conducting layer 108 of electrochromic device 300, however, there is conductive particle 302 or other artifact causing a defect. Conductive particle 302 results in a short between electrochromic layer 106 and counter electrode layer 110. This short affects the device locally in two ways: 1) it physically blocks the flow of ions between electrochromic layer 106 and counter electrode layer 110, and 2) it provides an electrically conductive path for electrons to pass locally between the layers, resulting in a transparent region 304 in the electrochromic layer 106 and a transparent region 306 in the counter electrode layer 110, when the remainder of layers 110 and 106 are in the colored state. That is, if electrochromic device 300 is in the colored state, where both electrochromic layer 106 and ion storage layer 110 are supposed to be colored, conductive particle 302 renders regions 304 and 306 of the electrochromic device unable to enter into the colored state. These defect regions are sometimes referred to as "halos" or "constellations" because they appear as a series of bright spots or stars against a dark background (the remainder of the device being in the colored state). Humans will naturally direct their attention to halos due to the high contrast of halos against a colored window and often find them distracting and/or unattractive. As mentioned above, visible shorts can be formed in other ways.

Figure 4A:
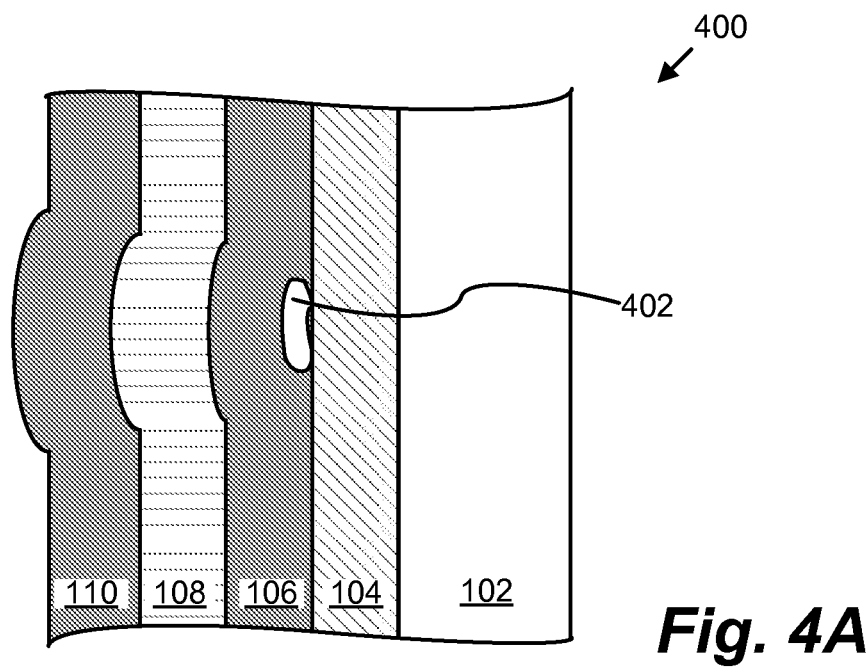
FIG. 4A is a schematic cross-section of an electrochromic device with a particle on the conductive layer prior to depositing the remainder of the electrochromic stack.

FIG. 4A is a schematic cross-section of an electrochromic device, 400, with a particle, 402, or other debris on conductive layer 104 prior to depositing the remainder of the electrochromic stack. Electrochromic device 400 includes the same components as electrochromic device 100. Particle 402 causes the layers in electrochromic stack to bulge in the region of particle 402, due to conformal layers 106-110 being deposited sequentially over particle 402 as depicted (in this example, transparent conductor layer 114 has not yet been deposited). While not wishing to be bound by a particular theory, it is believed that layering over such particles, given the relatively thin nature of the layers, can cause stress in the area where the bulges are formed. More particularly, in each layer, around the perimeter of the bulged region, there can be defects in the layer, for example, in the lattice arrangement, or on a more macroscopic level, cracks or voids. One consequence of these defects would be, for example, an electrical short between electrochromic layer 106 and counter electrode layer 110 or loss of ion conductivity in layer 108. These defects are not depicted in FIG. 4A, however.

Figure 4B:
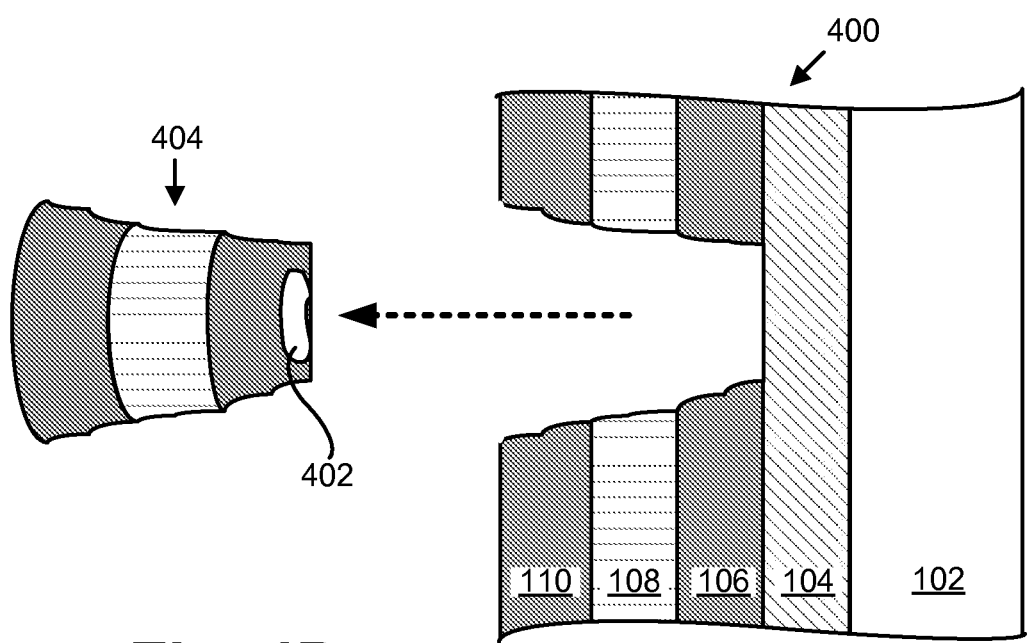
FIG. 4B is a schematic cross-section of the electrochromic device of FIG. 4A, where a "pop off" defect is formed during electrochromic stack formation.

Referring to FIG. 4B, another consequence of defects caused by particle 402 is called a "pop-off." In this example, prior to deposition of conductive layer 114, a portion above the conductive layer 104 in the region of particle 402 breaks loose, carrying with it portions of electrochromic layer 106, ion conducting layer 108, and counter electrode layer 110. The "pop-off" is piece 404, which includes particle 402, a portion of electrochromic layer 106, as well as ion conducting layer 108 and counter electrode layer 110. The result is an exposed area of conductive layer 104.

Figure 4C:
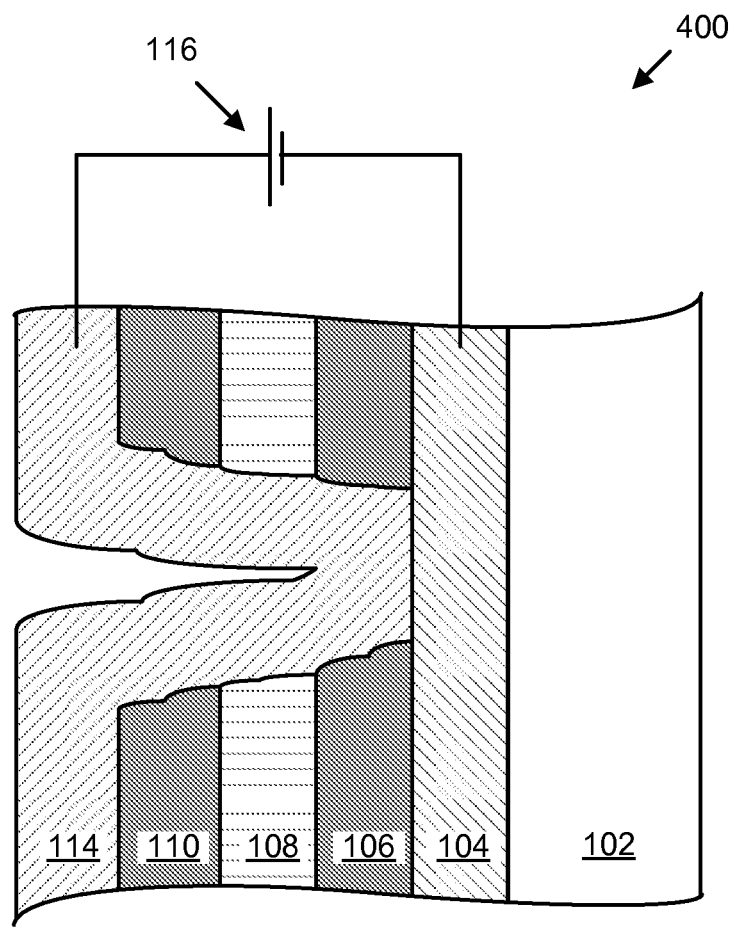
FIG. 4C is a schematic cross-section of the electrochromic device of FIG. 4B, showing an electrical short that is formed from the pop off defect once the second conductive is deposited.

Referring to FIG. 4C, after the pop-off of piece 404 and once conductive layer 114 is deposited, an electrical short is formed where conductive layer 114 comes in contact with conductive layer 104. This electrical short would leave a transparent region or halo in electrochromic device 400 when it is in the colored state, similar in appearance to the defect created by the short described above in relation to FIG. 3.

A typical defect causing a visible short may have a physical dimension of about 3 micrometers (sometimes smaller or larger, however) which is a relatively small defect from a visual perspective. However, these relatively small defects result in a visual anomaly, the halo, in the colored electrochromic window that are, for example, about 1 cm in diameter, and sometimes larger. Halos can be reduced significantly by isolating the defect, for example circumscribing the defect via laser scribe or by ablating the material directly without circumscribing it. For example, a circular, oval, triangular, rectangular, or other shaped perimeter is ablated around the shorting defect thus electrically isolating it from the rest of the functioning device (see also FIGS. 5 and 6 and associated description). The circumscription may be only tens, a hundred, or up to a few hundred microns in diameter. By circumscribing, and thus electrically isolating the defect, what was the visible short will now resemble only a small point of light to the naked eye when the window is colored and there is sufficient light on the other side of the window. When ablated directly, without circumscription, there remains no EC device material in the area where the electrical short defect once resided. Rather, there is a hole in the device and the base of the hole is, e.g., the float glass, the diffusion barrier, the lower transparent electrode material, or a mixture thereof. Since these materials are all transparent, light may pass through the base of the hole in the device, again, appearing only as a small point of light.

One problem with ablating a defect directly is that there is a chance that there will be further shorting issues, e.g., a metallic particle could be melted, with its size increased relative its size to prior to ablation. This could cause further shorting. For this reason, it is often useful to circumscribe defects, leaving a "buffer zone" of non-defective device around the defect (see FIGS. 6A and 6B and associated description). Depending on the diameter of a circumscribed defect, and the width of the laser beam, circumscribed pinholes may have some EC material, or not, remaining within the circumscription (the circumscription is typically, though not necessarily, made as small as possible). Such mitigated short defects may be manifest as pin points of light against the colored device, thus these points of light are commonly referred to as "pinholes." Isolation of an electrical short by circumscribing would be an example of a man-made pinhole, one purposely formed to convert a halo into a much smaller visual defect. However, pinholes may also arise as a natural result of defects in the optical device.

A pinhole is a region where one or more layers of the electrochromic device are missing or damaged so that electrochromism is not exhibited. Pinholes are not electrical shorts, and, as described above, they may be the result of mitigating an electrical short in the device. A pinhole may have a defect dimension of between about 25 micrometers and about 300 micrometers, typically between about 50 micrometers and about 150 micrometers, and thus is much harder to discern visually than a halo. In order to reduce the visible perception of pinholes resulting from the mitigation of halos, in certain embodiments the size of a purposely-created pinhole is minimized. In one embodiment, a laser ablation circumscription has an average diameter of about 400 micrometers or less, in another embodiment about 300 micrometers or less, in another embodiment about 200 micrometers or less, and in yet another embodiment about 100 micrometers or less. Depending upon the end user, pinholes on the larger side of this size regime tend not to be noticeable. If possible, laser ablation circumscriptions are made on the smaller side of this size regime, e.g., about 200 micrometers or less.

Circumscription of Visual Defects

FIG. 5 depicts an electrochromic lite, 500, having three halo shorting type defects (left) in the viewable area of the lite while the lite is in the colored state. The lite on the left of FIG. 5 shows the halos prior to mitigation. The defects show up as constellations or halos, sometimes on the scale of centimeters in diameter. Thus, they are visually distracting and unappealing to the viewer. The lite on the right depicts the same electrical short defects causing the three halos, after they have been circumscribed to form pinholes. It is apparent that pinholes are favorable to halos. However, oftentimes defects that are laser circumscribed in a conventional way do not cleanly form pinholes, that is, the pinholes are often electrically leaky and thus are not "clean" pinholes. In such cases, leakage causes the pinholes to resemble halos over time. The inventors have discovered the reason for this problem and have developed methods of overcoming it.

Figure 6A:
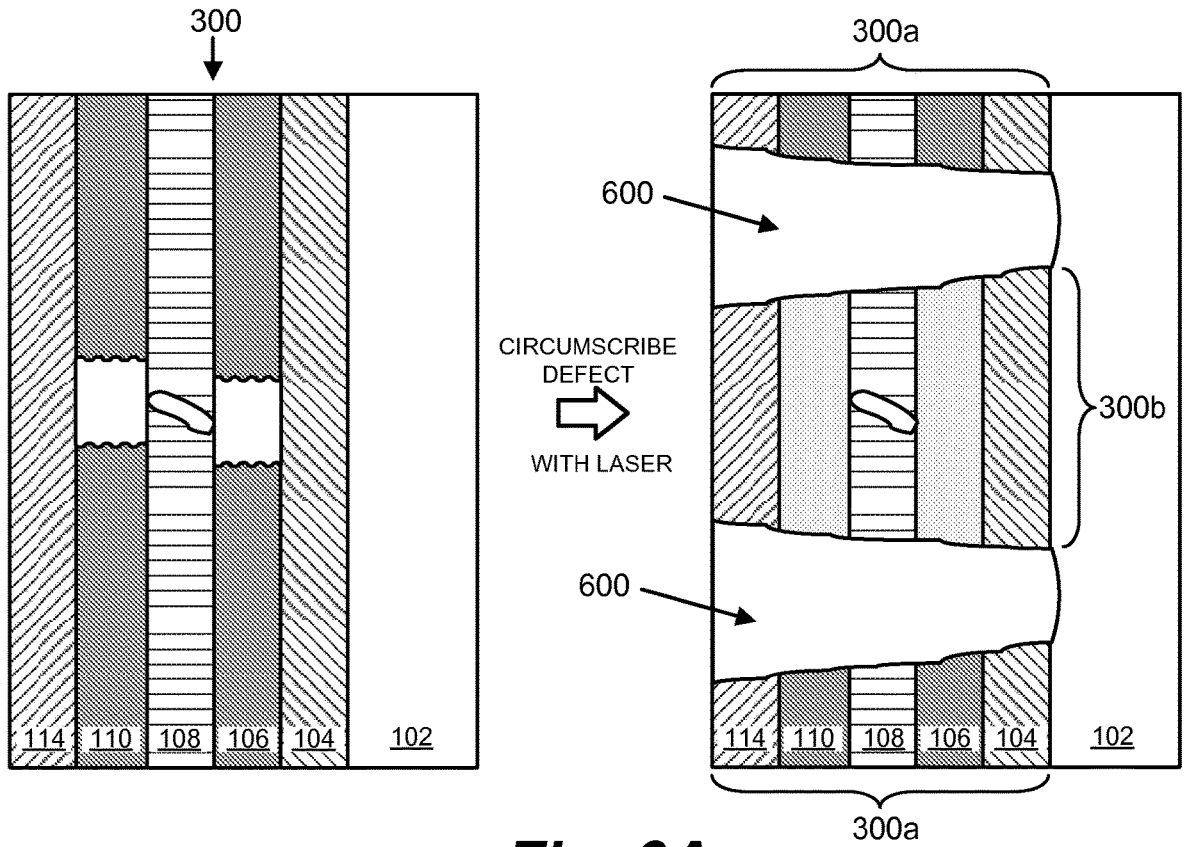
FIGS. 6A-B depict a conventional laser ablation circumscription of a particle defect.
Figure 6B:
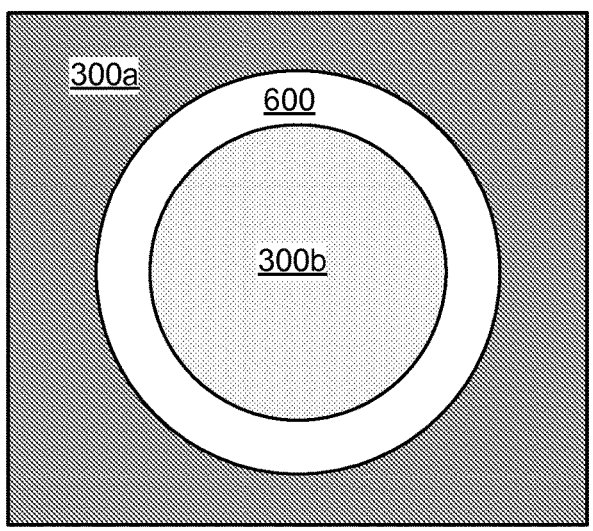

The left-hand portion of FIG. 6A depicts a cross section of device 300, as described in relation to FIG. 3, which has a conductive particle spanning ion conducting layer 108. Device 300 is in a colored state, but the electrical short from the particle creates non-colored regions in the electrochromic and counter electrode layers, 106 and 110, respectively. Referring to the right-hand portion of FIG. 6A, when the particle causing this visual anomaly is circumscribed, e.g., while device 300 remains in the colored state, a continuous trench, 600, is formed around the particle as well as some of the device stack. Trench 600 isolates a portion, 300*b*, of device 300 from the bulk device, 300*a*. FIG. 6B shows this laser isolation scribe from a top view (for simplicity the shorting particle is not shown). Ideally this laser ablation electrically isolates material 300*b* from the bulk device 300*a*. So, the device material remaining within trench 600 does not color, but does have some absorptive properties and is thus slightly more colored than substrate 102 at the bottom of trench 600. However, as described above, this electrical isolation is not always so clean as depicted in FIGS. 6A and 6B. This is explained in more detail in relation to FIG. 7.

Laser isolation need not penetrate all the layers of the device stack, e.g., as depicted in FIGS. 6A and 6B. The laser can penetrate any depth from removing the outer layer (e.g., 114) to the full stack, and any depth in between. For example, the laser need only penetrate one of the transparent conducting layers (104 or 114) in order to electrically isolate the stack material within the perimeter of the scribe. The scribe may penetrate one, two, three, four or all five layers of the device (having five layers). In devices that have graded compositions rather than distinct layers, e.g., an electrochromic device as described in association with FIG. 2, penetration of the entire device structure may be necessary.

Referring to FIG. 7, conventional laser circumscription methods employ a "closed" perimeter scribe. The closed perimeter could be of any shape, but for convenience circular perimeters are described herein. That is, the laser is applied to a local region or spot, 700, chosen at some distance from a defect. The laser is applied around the defect in a closed pattern, e.g., a circle, where the laser begins ablation at spot 700 and ends at spot 700; that is, the beginning and ending position of the laser is substantially the same or at least there is some overlap of the area of the laser focus and/or width of the laser scribe at the beginning and ending positions. "Overlap" in this description refers to the overlapping of the area of the laser focus and/or width of the laser scribe created by the laser path, and how this area or width is overlapped by the laser during ablation. For example, if the laser is focused on a first position and then again on this same position at the end of the laser path, then this is 100% overlap. If, however, the laser is focused on the first position and then on a second position that is moved a distance equal to the radius of the focal point, then this is 50% overlap.

This type of closed pattern, where the start and end point overlap each other and are part of the perimeter thus formed, creates further problems. Although it isolates the defect within it, perimeters formed in this way have problems in the region where the ablation start and end overlap each other. That is, for any particular device, a particular fluence (energy delivered per unit area) is chosen such that it is enough to ablate the device layers and effectively electrically isolate one area of the device from another. This is effective for the majority of the perimeter region when a defect is circumscribed, but in the area where the laser starts, and where the start and finish overlap each other, there is often excessive energy which results in stack melting and electrical shorting of the film stack in that area. This is particularly true of the point where the laser starts. There is a transient energy flux created when the laser is energized. This excess energy is imparted to the device when the laser first strikes the device. This is depicted in a micrograph in FIG. 7 (bottom) of a portion of an actual laser circumscription, showing that the width of the circumscription is wider at a point, 705, where the laser started and finished the perimeter around a defect (in this example the overlap of starting and stopping point was 40%). It is at this point where further shorting occurs. In order to avoid this issue, a lower fluence may be selected, but that often results in insufficient ablation of the film around the remainder of the perimeter. Embodiments described herein overcome these problems, e.g., by creating an ablation perimeter where the fluence is sufficient to electrically isolate the shorting defect, while substantially uniform about the ablation perimeter.

One method to overcome the above-described problem of excess energy due to the transient flux during laser energizing is to shutter the laser beam until it reaches steady state energy level and then to apply the laser to the circumscription pattern. In this way excess energy can be avoided. One embodiment is a method of forming a laser ablation perimeter surrounding a defect in an optical device, the method including: a) energizing a laser while the laser beam is shuttered; b) allowing the laser to reach a steady state energy level; and c) circumscribing the defect with the laser. This method may be used with any circumscription pattern described herein, because the issue of excessive energy is avoided by use of the shutter. For example, a conventional closed pattern as described in relation to FIG. 7 may suffice when using this method.

Another method to overcome the above-described problem of excess energy is to make a conventional perimeter, but to overlap the starting and ending positions of the laser beam only enough so as to close the perimeter but not create excess energy (e.g., to minimize melting and shorting created thereby); the smaller the overlap, the smaller the portion of the device that may have shorting due to excess energy. Because the overlap is minimized, high precision is necessary to ensure both complete closure of the perimeter (to ensure electrical isolation) as well as minimum damage due to excess energy in the overlap region (thus causing electrical shorts). One embodiment is a method of forming a laser ablation perimeter surrounding a defect in an optical device, the method including forming the laser ablation perimeter without complete overlap of both the starting and the stopping the laser beam positions, wherein the overlap of the starting and stopping positions is less than about 25%. In one embodiment the overlap of the starting and stopping positions is less than about 10%, and in another embodiment, less than about 5%. However, this method may need more adjustments than other methods described below, as excess energy may occur with the transient energy flux at laser startup; e.g., overlapping of the start and finish points may be irrelevant because the start point itself may cause excessive fluence. Other embodiments compensate for this, as described below.

In one embodiment, laser circumscription is performed in a closed pattern as in a conventional sense described above, with greater than about 25% overlap of starting and stopping positions, but where a process window is chosen such that lower fluence is used at the beginning and end of the circumscription (e.g., during the transient fluence conditions associated with starting and stopping the laser) than over the remainder of the circumscription. That is, the laser circumscription employs a two phase process window, including a transient process condition (at the beginning and/or end of the scribe) and a steady state process condition during the remainder of the laser scribe process. In this embodiment, excessive energy is avoided by lowering the energy delivered at the start and end of the perimeter thus formed, that is, during the transient process condition. One embodiment is a method of forming a laser ablation perimeter surrounding a defect in an optical device, the method including: a) starting application of a laser at a first fluence level in a first region of the laser ablation perimeter; b) translating the laser from the first region to a second region of the laser ablation perimeter, while increasing the fluence level of the laser as it transitions from the first region to the second region; and c) returning the laser to the first region in order to close the perimeter while decreasing the fluence level of the laser, wherein the energy about the laser ablation perimeter is substantially uniform and the overlap of the laser in the first region is at least 25%. By attenuating the fluence at the start and ending positions of the laser, during which otherwise excess energy would result, an ablation perimeter of substantially uniform energy is achieved. Decreasing the fluence level can be achieved, for example, by defocusing the laser, while increasing the fluence can be achieved by focusing the laser. One of ordinary skill in the art would appreciate that other ways of increasing and decreasing the fluence are possible. In other embodiments, laser perimeters are formed without having to change the fluence at any point during formation of the perimeter. These embodiments are described in more detail below.

In certain embodiments, a laser perimeter is formed by starting and/or stopping the scribing process within the perimeter, that is, within the area surrounded by the perimeter. The distance within the perimeter that the starting and/or stopping point is located is chosen so that it is sufficiently far away from the perimeter scribe so there is no excessive energy that would occur otherwise at the perimeter. The starting and stopping point need not be at the same location, but can be. For example, in one embodiment, the scribe starts and ends within the perimeter formed at the center of a circular perimeter. This is depicted in FIG. 8.

The top portion of FIG. 8 depicts a laser scribe pattern. The pattern starts proximate to or at the center, 800, of a circular perimeter that is to be formed. The defect is typically located proximate 800. The laser is moved to a position, 805, to form an outer radius, and then a circular pattern is scribed. When the laser reaches point 805, or proximate thereto, it travels back toward the center of the circular pattern, proximate position 800. In this example, excessive energy due to the transient process conditions of starting and ending the laser scribe process are in the center of the perimeter formed, and thus are isolated from the perimeter portion of the pattern. The fluence is chosen to make effective electrical isolation scribes at the perimeter. Proximate position 805, the scribe line may overlap, so long as there is not undue overlap that would otherwise cause electrical shorting as in conventional laser circumscription.

The bottom portion of FIG. 8 shows an actual laser circumscription following the pattern described in the upper portion of FIG. 8 (in this example the pattern is 300 m in diameter). In this example, the laser line overlaps 90% of the thickness of the line at point 805 and continues inward to stop at position 800. In one embodiment, the overlap is between about 10% and about 100% at some point along the perimeter, e.g., to close the perimeter as in the example described in relation to FIG. 8. In one embodiment, the overlap is between about 25% and about 90%, and in another embodiment, between about 50% and about 90%. In this example, the "dimple," 810, in the perimeter portion reflects the incomplete (i.e., about 90%) overlap of the line at position 805; if the line had overlapped 100%, there would be no dimple in the circular pattern. Note also that the interior (electrically isolated) portion, 815, of the device does not tint as the bulk device, 820, is tinted. This particular method has the added feature that the starting and stopping point is centered on the defect, so the excess energy is directed to the defect itself. Thus, the coordinates of the defect are used as the start and stop point of the laser pattern to form the perimeter around the defect. The excess energy is contained within the perimeter and thus causes no further shorting; also, this excess energy at the center may aid in making the pinhole created less noticeable as it melts the device materials in that region and may diffuse light better than the defect alone may have done. Also, by having the starting and stopping point at the center, the distance between the perimeter formed and the excess energy spot is maximized in all directions.

By using patterns such as described in relation to FIG. 8, any transient effects resulting in excess energy are contained within the perimeter region and thus do not cause further electrical shorting. Put another way, a highly uniform perimeter portion of a scribe is formed, i.e., without any excess fluence along the perimeter portion of the scribe. By isolating portions of excess energy from the perimeter portion of the scribe, the scribe process can be adjusted for good steady state conditions, dramatically widening the range of acceptable parameter settings that result in effective and uniform electrical isolation about the perimeter portion of the scribe. For example, fluence levels can be set at higher values to allow adequate steady state scribing, while isolating excessive energy (from starting and stopping the laser) within the perimeter region.

In some embodiments, the starting point of the laser focus is located near or at the defect (e.g., a pinhole defect). By starting the laser focus at this location, the laser can at least partially, if not entirely, mitigate the defect by vaporize the materials in a region at or near the defect before the laser focus is moved to another location along the ablation perimeter. Vaporizing the materials in this region may diffuse light better than if the defect were only circumscribed. An exemplary method of forming a laser ablation perimeter about a defect in an optical device includes: a) starting application of a laser with a laser focus at a first position located proximate the defect; b) at least partially mitigating the defect; c) moving the laser focus from the first position to a second position that is part of the laser ablation perimeter; d) moving the laser focus along the laser ablation perimeter until the laser focus is proximate the second position; and e) closing the laser ablation perimeter. In some cases, closing the laser ablation perimeter includes overlapping the laser focus at the second position. The overlapping of the second position is as described above in relation to FIG. 8. In one case, the method also includes moving the laser focus to a position within the area surrounded by the laser ablation perimeter. In another case, returning the laser to within the area surrounded by the laser ablation perimeter includes returning the laser focus proximate the first position.

One embodiment is a method of forming a laser ablation perimeter about a defect in an optical device including: a) starting application of a laser at a first position, within an area that will be surrounded by the laser ablation perimeter; b) translating the laser focus from the first position to a second position, the second position being a part of the laser ablation perimeter; c) translating the laser about the defect until the laser focus is proximate the second position; d) closing the laser ablation perimeter by overlapping the second position with the laser focus; and e) returning the laser to a position within the area surrounded by the laser ablation perimeter. The laser is stopped after e). The overlapping of the second position is as described above in relation to FIG. 8. In one case, returning the laser to the area surrounded by the laser ablation perimeter includes returning the laser to the first position and stopping the ablation. In another case, the laser is stopped at a third position, within the area surrounded by the perimeter. One example of this is described in relation to FIG. 9.

Figure 9:
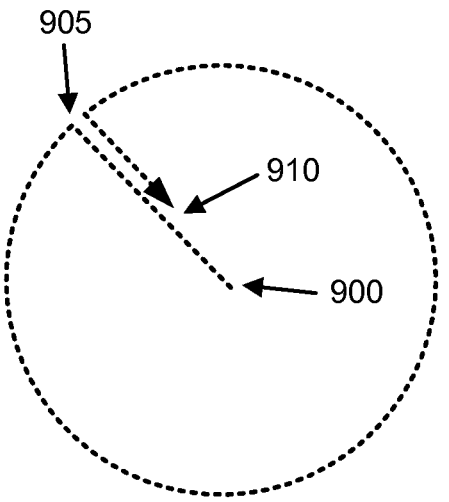

FIG. 9 shows a pattern, similar to that described in relation to FIG. 8. In this pattern, the laser ablation starts at position 900, moves along a line to position 905 to form a radius, then circles counterclockwise (in this example, but clockwise would work) until reaching 905, where there is overlap as described above. Then the laser moves to position 910, within the interior of the perimeter portion of the scribe.

In this example, the laser stops short of position 900 at the end of the scribe process. This is an example of the laser start and stop positions being different, but both inside the perimeter portion of the scribe.

Figure 10:
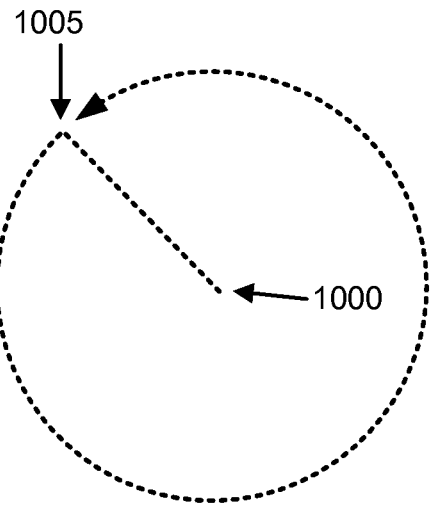

FIG. 10 shows a pattern, similar to that described in relation to FIG. 8. In this pattern, the laser ablation starts at position 1000, moves along a line to position 1005 to form a radius, and then circles counterclockwise until reaching 1005, where there is overlap as described above. In this example, the laser stops proximate, or on, position 1005 at the end of the scribe process. This is an example of the laser start being inside the perimeter portion of the scribe with the laser end position being part of the perimeter portion of the scribe. By choice of the start position of the laser and by avoiding any overlap of start and stopping positions, there is no excessive energy in the perimeter portion of the scribe.

One embodiment is a method of forming a laser ablation perimeter about a defect in an optical device including: a) starting application of a laser at a first position, within the area that will be surrounded by the laser ablation perimeter; b) translating the laser from the first position to a second position, the second position being a part of the laser ablation perimeter; c) translating the laser about the defect until the laser focus is proximate the second position; and d) closing the laser ablation perimeter by overlapping the second position with the laser focus, wherein the closure position is also the stopping position of the laser. The overlap is as described above with respect to FIG. 8.

Figure 11:
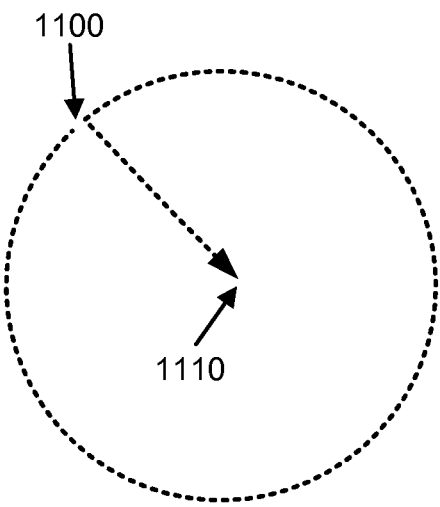

FIG. 11 shows a pattern, similar to that described in relation to FIG. 8. In this pattern, the laser ablation starts at position 1100, moves counterclockwise along a circular path until reaching 1100, where there is overlap as described above with respect to FIG. 8. Then the laser moves to position 1110, within the perimeter portion of the scribe. This is an example of the laser start being part of the perimeter portion of the scribe while the laser end position is within the perimeter portion of the scribe. In this example, since the start position is part of the perimeter region, careful choice of laser energy may be required.

One embodiment is a method of forming a laser ablation perimeter about a defect in an optical device including: a) starting application of a laser at a first position, within the line that will define the laser ablation perimeter; b) translating the laser about the defect until the laser focus is proximate the first position; c) closing the laser ablation perimeter by overlapping the laser focus with the first position; and d) moving the laser to within the area surrounded by the laser ablation perimeter. The overlap is as described above with respect to FIG. 8. In one embodiment, d) further includes moving the laser to the center of the perimeter. In another embodiment, d) further includes moving the laser inside the first position in a spiral pattern, at least some overlap occurring in the spiral pattern. An example of this latter embodiment is described in relation to a specific example in FIG. 12.

Figure 12:
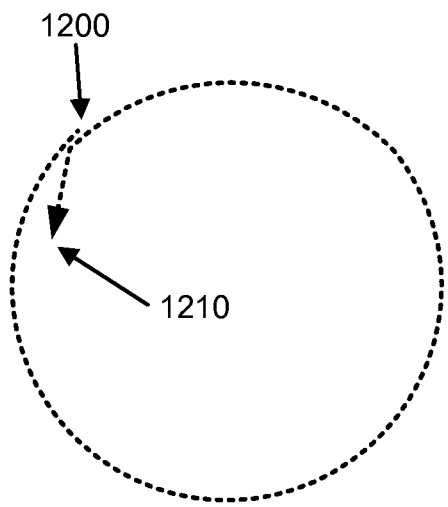

FIG. 12 shows a pattern, similar to that described in relation to FIG. 8. In this pattern, the laser ablation starts at position 1200, moves counterclockwise along a substantially circular path until coming close to position 1200. In this example, the laser focus is brought close to the starting position, but spirals inward, so that there is some overlap of the ablation focus to close the perimeter, but not create excess energy proximate position 1200. The overlap is as described above with respect to FIG. 8. In this example, since the start position is part of the perimeter region, careful choice of laser energy may be required. In the example depicted, the laser is brought to point 1210; however the laser could stop prior to this position so long as the perimeter is closed by the overlap described. This is an example of the laser start being part of the perimeter portion of the scribe while the laser end position is within the perimeter portion of the scribe. Since there is not overlap of both the beginning and ending transients of the laser, there is not excessive energy.

FIG. 13 shows a pattern, similar to that described in relation to FIG. 12. In this pattern, the laser ablation starts at position 1300, moves counterclockwise along a substantially circular path until spiraling inward to cross at a point, 1305, and finally ending at point 1310. In this example, there is 100% overlap at crossing point 1305, but both the start and stop positions are within the perimeter portion of the scribe pattern, therefore excess energy is avoided.

One embodiment is a method of forming a laser ablation perimeter surrounding a defect in an optical device, the method including: a) starting application of a laser at a starting position, within the area that will be surrounded by the laser ablation perimeter; b) translating the laser from the first position and about the defect until the laser focus crosses its own path, but not at the starting position. The laser may be stopped at the crossing point or once past the crossing point.

FIG. 14 shows a pattern, similar to that described in relation to FIG. 13. In this pattern, the laser ablation starts at position 1400, moves outward along a radius to position 1405, then runs counterclockwise along a substantially circular path until reaching a third point, 1410, the runs inward along a radius, crossing the first radius at point 1415 and finally ending at point 1420. In this example, there is 100% overlap at crossing point 1415, but both the start and stop positions are within the perimeter portion of the scribe pattern, therefore excess energy is avoided. Also, another feature of this pattern is that since the angle θ is acute, there is gradually increasing overlap between the lines prior to the full intersection point 1415. This gradual overlap assures that the region of the perimeter of the scribe proximate intersection 1415 does not have excessive energy, as the point of maximum overlap, 1415, is not the exterior-most portion of the scribe line, but rather is a gradient of overlap starting from lower to higher overlap.

One embodiment is a method of forming a laser ablation perimeter surrounding a defect in an optical device, the method including: a) starting application of a laser at a first position, within the area that will be surrounded by the laser ablation perimeter; b) translating the laser from the first position to a second position, the second position being a part of the laser ablation perimeter; c) translating the laser about the defect until the laser focus crosses its own path, between the first and second position. The laser may be stopped at the crossing point or once past the crossing point.

EXAMPLE

Laser ablation perimeters were formed in an electrochromic device using the pattern described in relation to FIG. 8 in comparison to a conventional laser ablation perimeter. The laser perimeter was ablated using a fluence of 1.6 J/cm2 using 90% overlap of the laser lines starting at the point on the perimeter where the lines meet in order to close the perimeter and continuing on to the center of the perimeter where the laser ablation also started. Perimeters of 50, 100, 200, 300, 400 and 500 microns were formed. The actual patterns are shown in FIG. 15. FIG. 15 shows the colored electrochromic device with the laser scribe patterns arranged thereon. As shown, the device remaining in the interior region of the perimeter is not colored as in the bulk device surrounding the perimeters. Further testing showed that the 50 m pattern did show some leakage, but this was likely the result of the geometrical limitation due to the size of the laser focal point as compared to the pattern size. If a smaller focal point is used, then smaller patterns, such as 50 m in diameter, are likely to work just as well as the larger sized patterns.

Figure 16:
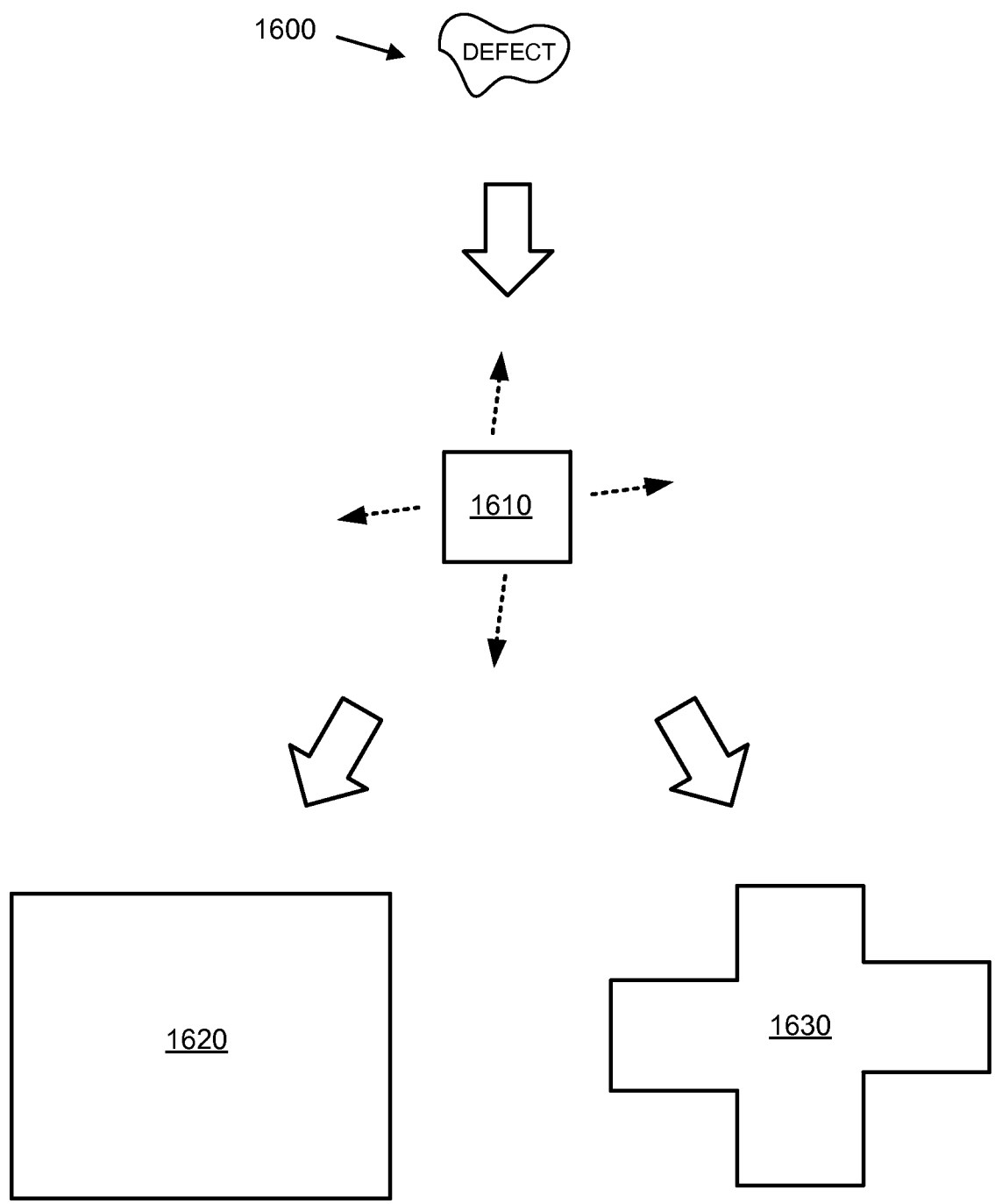
FIG. 16 shows a schematic drawing illustrating a method of ablating a defect that moves a laser focus in a pattern that covers an area encompassing the defect.

One embodiment is a method of ablating a defect (e.g., pinhole or short-related defect) with a laser focus spot that first locates the focus spot at or near the defect and then moves the focus spot to ablate over an ablation area that includes the defect area. This may be conveniently done by first focusing the laser at a location at or near the center of the defect, but the method does not necessarily need to do so. In some cases, the focus spot may be moved in such a way to cover one or more regions. These regions may overlap each other in some cases. A rasterizer may be used to move the focus spot over the one or more regions. The ablated area need not be a regular shape. The ablated area can be in the form of, for example, a circle, a rectangle, sawtooth pattern, a cross shape, or other shape. FIG. 16 shows a schematic drawing illustrating this method. In this illustrated example, a laser focus spot 1610 is first located at or near a defect 1600. The focus spot 1610 can be moved in any direction (as illustrated by the arrows) to ablate over an area that includes the defect area. Two examples of shapes of ablated areas are shown. The first example is a rectangular ablated area 1620. The second example is a cross pattern ablated area 1630. In some cases, the focus spot may be moved in one or more regions that make up the ablated area.

Although the foregoing embodiments have been described in some detail to facilitate understanding, the described embodiments are to be considered illustrative and not limiting. It will be apparent to one of ordinary skill in the art that certain changes and modifications can be practiced without avoiding the scope of the following claims.

What is claimed is:

1. A method of forming a laser ablation perimeter surrounding a defect in an optical device, the method comprising:
   a. starting application of a laser with a laser focus at a first position, the first position located within an area that will be surrounded by the laser ablation perimeter;
   b. translating the laser focus from the first position to a second position, the second position being a part of the laser ablation perimeter;
   c. translating the laser focus about the defect along the laser ablation perimeter until the laser focus is proximate the second position;
   d. closing the laser ablation perimeter by overlapping the laser focus at the second position; and
   e. returning the laser focus to the area surrounded by the laser ablation perimeter where laser ablation is then ceased.

2. The method of claim 1, wherein overlapping the laser focus at the second position generates an overlap in a range from about 10% to 100%.

3. The method of claim 1, wherein overlapping the laser focus at the second position generates overlap in a range from about 25% to about 90%.

4. The method of claim 1, wherein overlapping the laser focus at the second position generates overlap in a range from about 50% to about 90%.

5. A method of forming a laser ablation perimeter surrounding a defect in an optical device, the method comprising:
   a. energizing a laser while a laser beam is shuttered;
   b. allowing the laser to reach a steady state energy level;
   c. applying a laser focus to a first position located within an area that will be surrounded by the laser ablation perimeter and circumscribing the defect with the laser beam by moving the laser focus along the laser ablation perimeter;
   d. closing the laser ablation perimeter by overlapping the laser focus at a second position; and
   e. returning the laser focus to the area surrounded by the laser ablation perimeter where the laser ablation is then ceased.

6. A method of forming a laser ablation perimeter surrounding a defect in an optical device, the method comprising:
   a. starting application of a laser with a laser focus at a starting position, within an area that will be surrounded by the laser ablation perimeter; and
   b. translating the laser focus from the starting position and about the defect until the laser focus crosses its own path, but not at the starting position.

7. The method of claim 6, wherein the laser is stopped once the laser focus is translated past a crossing point.

8. A method of forming a laser ablation perimeter surrounding a defect in an optical device, the method comprising:
   a. starting application of a laser with a laser focus at a first position, within an area that will be surrounded by the laser ablation perimeter;
   b. translating the laser focus from the first position to a second position, the second position being a part of the laser ablation perimeter; and
   c. translating the laser focus about the defect until the laser focus crosses its own path, between the first position and the second position.

9. The method of claim 8, wherein the laser is stopped once the laser focus is translated past a crossing point.

10. The method of claim 1, wherein the laser ablation perimeter has an average diameter of about 300 micrometers or less.

11. The method of claim 1, wherein the laser ablation perimeter has an average diameter of about 200 micrometers or less.

12. The method of claim 1, further comprising at least partially mitigating the defect.

* * * * *